US012222160B2

(12) United States Patent
Chang et al.

(10) Patent No.: US 12,222,160 B2
(45) Date of Patent: Feb. 11, 2025

(54) MATERIAL PROCESSING APPARATUS USING QUASI-TRAVELING MICROWAVE TO CONDUCT HEAT TREATMENT

(71) Applicant: National Tsing Hua University, Hsinchu (TW)

(72) Inventors: Tsun-Hsu Chang, Hsinchu (TW); Hsein-Wen Chao, Hsinchu (TW); Hung-Chun Hsu, Hsinchu (TW); Yan-Ren Chen, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 644 days.

(21) Appl. No.: 17/540,401

(22) Filed: Dec. 2, 2021

(65) Prior Publication Data

US 2023/0131336 A1 Apr. 27, 2023

(30) Foreign Application Priority Data

Oct. 27, 2021 (TW) ................................ 110139842

(51) Int. Cl.
*F26B 3/347* (2006.01)
*H05B 6/64* (2006.01)
*H05B 6/70* (2006.01)

(52) U.S. Cl.
CPC ........... *F26B 3/347* (2013.01); *H05B 6/6402* (2013.01); *H05B 6/707* (2013.01); *H05B 2206/046* (2013.01)

(58) Field of Classification Search
CPC ...... F26B 3/347; F26B 13/001; H05B 6/6402; H05B 6/707; H05B 2206/046; H05B 6/80; H05B 6/701
See application file for complete search history.

(56) References Cited

U.S. PATENT DOCUMENTS 3,215,955 A * 11/1965 Thomas ............... H03B 5/1817 455/105
2014/0166645 A1 6/2014 Sadahira et al.

FOREIGN PATENT DOCUMENTS

CN 204577550 U * 8/2015
CN 106460243 2/2017
(Continued)

OTHER PUBLICATIONS

Translation, CN-204577550-U (Year: 2015).*
(Continued)

*Primary Examiner* — Jessica Yuen

(57) ABSTRACT

A material processing apparatus is disclosed. This material processing apparatus is particularly developed to utilize a quasi-traveling microwave to conduct heat treatment for a thread-type article like fiber, silk, artificial fiber, and artificial silk. The material processing apparatus comprises a primary waveguide tube, a microwave blocking plate, a secondary waveguide tube, and at least one microwave absorbing member disposed of in the primary waveguide tube. By such design, a microwave source supplies a microwave to the secondary waveguide tube and the primary waveguide tube, such that the microwave travels in the two waveguide tubes so as to become a quasi-traveling microwave. Therefore, in the case of a thread-type article being be fed into the primary waveguide tube via the secondary waveguide tube by a thread-type article transferring mechanism, the thread-type article is steadily and evenly heated by the quasi-traveling microwave in the two waveguide tubes.

10 Claims, 5 Drawing Sheets

(56) References Cited

FOREIGN PATENT DOCUMENTS

| | | | | |
|---|---|---|---|---|
| JP | 2020-167070 | | 10/2020 | |
| TW | 201932654 | | 8/2019 | |
| TW | 202136688 | | 10/2021 | |
| WO | WO-2018112531 | A1 * | 6/2018 | ............ A01M 1/226 |

OTHER PUBLICATIONS

Search Report for Taiwan counterpart application TW110139842, date Oct. 30, 2022.

(English translation) Search Report for Taiwan counterpart application TW110139842, date Oct. 30, 2022.

* cited by examiner

MATERIAL PROCESSING APPARATUS USING QUASI-TRAVELING MICROWAVE TO CONDUCT HEAT TREATMENT

BACKGROUND OF THE INVENTION

1. Field of the Invention

The present invention relates to the technology field of heat treatment apparatuses, and more particularly to a material processing apparatus using quasi-traveling microwave to conduct heat treatment.

2. Description of the Prior Art

It is well known that a boiler is one kind of heat treatment apparatus utilizing heat transfer. Therefore, it is also understood that the boiler is not one heat penetration type heat treatment apparatus. Engineers skilled in designing and manufacturing heat treatment apparatuses certainly know that a boiler principally comprises a heating device (i.e., heat source) and an accommodation device. During conducting a material heating process, heat generated by the heating device is transferred to an article that is accommodated in the accommodation device through a heat transferring medium like steam, high-temperature water, or organic heat carrier. In other words, after being generated by the heating device, heat is subsequently transferred to the article's surface along a heat transferring path constituted by the heat transferring medium and the accommodation device, thereby being eventually transferred to reach the center of the article.

According to experiences, the main drawback of the boiler is a low rate of temperature rise. For this reason, it needs to control the boiler to complete a preheating process prior to starting the material heating process. On the other hand, because the article does not directly receive heat from the boiler, it is imaginable that there is a considerable heat loss occurring in the material heating process, thereby influencing the yield of the material heating process because the article is heated unevenly.

On the other hand, microwave is a form of electromagnetic radiation with wavelengths ranging from about one meter to one millimeter corresponding to frequencies between 300 MHz and 300 GHz respectively (wavelengths between 1 m and 1 mm). Compared to infrared ray and far-infrared ray, microwave is found to perform better penetration depth in the medium. When microwave penetrates a specific medium, molecules in the specific medium are energized by the power of microwave so as to vibrate with high speed, and then the specific medium's temperature is getting high due to the high-speed vibration of the molecules, such that the medium is hence heated.

Recently, microwave heat treatment apparatus has been widely used in the material heating process by utilizing a microwave to penetrate the material. Compared to the traditional boiler (i.e., non-heat penetration type heat treatment apparatus), the microwave heat treatment apparatus shows advantages of high temperature rising rate, short material processing time, and energy saving. For example, a microwave oven, comprising a microwave generator and a resonant cavity, is one typical microwave heat treatment apparatus and has been widely used in everyone's home. During the operation of the microwave oven, the microwave generator supplies a microwave into the resonant cavity, and then the microwave is continuously reflected by the inner walls of the resonant cavity, thereby forming a standing wave in the resonant cavity. In the resultant waveform of the standing wave, there are some points consistently having zero amplitude. These points are called nodes. On the other hand, the resultant waveform of the standing wave varies from twice the amplitude of its constituent waveforms in both directions. These points are called antinodes. Since nothing cooks at the nodes, a turntable is necessary to ensure that all of the food passes through the antinodes and gets cooked.

Furthermore, microwave heat treatment technology is nowadays applied in the manufacture of microwave drying equipment. For example, Taiwan Patent No. 1739132 has disclosed a fiber manufacturing device, comprising: a fiber drawing unit, a microwave drying unit, and a cutting unit. In which, the fiber drawing unit applies a drawing process to a raw material (e.g., polymer) for forming a fiber, and the drawn fiber is subsequently fed into the microwave drying unit. According to the disclosures of Taiwan Patent No. 1739132, there is a moving platform disposed of in a resonant cavity of the microwave drying unit, and the moving platform is adopted for carrying the fiber to move in the resonant cavity by a constant moving speed. By such arrangement, the fiber moving in the resonant cavity is heated by the microwave supplied by a microwave source, thereby drying the moisture content in the fiber.

It is a pity that the disclosed microwave drying unit is found to fail to complete a continuously drying process for a continuous material like silks and fiber because of lacking continuous material transferring units (e.g., unwinding mechanism and winding mechanism). On the other hand, for enhancing the drying efficiency, the microwave drying unit is designed to include multiple microwave sources to simultaneously supply multiple microwaves into the resonant cavity, so as to form a multi-mode standing wave in the resonant cavity. However, according to real experiences, in case of each microwave's parameters (e.g., wavelength and frequency) are not to be optimized, it is difficult to utilize the multi-mode standing wave to both evenly heat the silk and/or the fiber and achieve a high drying efficiency.

From the above descriptions, it is understood that there is room for improvement in the conventional microwave heat treatment apparatus. In view of that, the inventor of the present application has made great efforts to make inventive research and eventually provided a material processing apparatus using quasi-traveling microwave to conduct heat treatment.

SUMMARY OF THE INVENTION

The primary objective of the present invention is to disclose a material processing apparatus using quasi-traveling microwave to conduct heat treatment. This material processing apparatus is particularly developed to utilize a quasi-traveling microwave to conduct heat treatment for a thread-type article like fiber, silk, artificial fiber, and artificial silk. The material processing apparatus comprises a primary waveguide tube, a microwave blocking plate, a secondary waveguide tube, and at least one microwave absorbing member disposed of in the primary waveguide tube. By such design, a microwave source supplies a microwave to the secondary waveguide tube and the primary waveguide tube, such that the microwave travels in the two waveguide tubes so as to become a quasi-traveling microwave. Therefore, in the case of a thread-type article being be fed into the primary waveguide tube via the secondary waveguide tube by a thread-type article transferring mechanism, the thread-type article is steadily and evenly heated by the quasi-traveling microwave in the two waveguide tubes.

For achieving the primary objective mentioned above, the present invention provides an embodiment of the material processing apparatus, comprising;

- a primary waveguide tube, having a front opening and a rear opening;
- a microwave blocking plate, being connected to the primary waveguide tube for shielding the rear opening, and having at least one material exporting hole;
- a secondary waveguide tube consisting of a first segment and a second segment, wherein the first segment has a first opening correspondingly connected to a waveguide tube of a microwave source, the second segment having a second opening for being correspondingly assembled with the front opening of the primary waveguide tube, a bending angle existing between the second segment and the first segment, and the first segment is provided with at least one material importing hole thereon that is coaxial to the at least one material exporting hole; and
- at least one microwave absorbing member made of a microwave absorbing material, being disposed of in the primary waveguide tube, and having at least one hollow cavity;
- wherein by using a driver device, at least one thread-type article is fed into the secondary waveguide tube via at least one material importing hole, subsequently moving into the at least one hollow cavity, and eventually leaving the primary waveguide tube via at least one material exporting hole of the microwave blocking plate;
- wherein the microwave source supplies a microwave into the second waveguide tube and the primary waveguide tube, such that the microwave travels in the second waveguide tube and the primary waveguide tube along a wavefront so as to become a quasi-traveling microwave;
- wherein in case of moving in the second waveguide tube and/or the primary waveguide tube, a first part of the thread-type article and the microwave absorbing member being both heated because of receiving the quasi-traveling microwave, and a second part of the thread-type article being heated by inner walls of the hollow cavity.

In one embodiment, the primary waveguide tube and the secondary waveguide tube are both selected from a group consisting of rectangular waveguide tube, circular waveguide tube, and irregular waveguide tube.

In one embodiment, the primary waveguide tube and the second waveguide tube are both made of a metal material.

In one embodiment, there is at least one thermal insulation block disposed of in the primary waveguide tube for supporting at least one microwave absorbing member, such that the microwave absorbing member is thermally isolated with the inner walls of the primary waveguide tube.

In one embodiment, the thread-type article is selected from a group consisting of fiber, silk, artificial fiber, and artificial silk.

In one embodiment, the thermal insulation block has a recessed groove for correspondingly receiving a bottom of the microwave absorbing member.

In one embodiment, there is a plurality of observation windows provided on the top side of the primary waveguide tube, and each of the observation windows is made of quartz glass.

In one embodiment, the first segment is provided with a cushion block thereon, and at least one material importing hole perforating both the first segment and the cushion block.

In one embodiment, a first opening edge of the front opening is provided with a first connection plate thereon, and a second opening edge of the second opening is provided with a second connection plate thereon, such that the front opening is correspondingly assembled with the second opening by connecting the first connection plate with the second connection plate.

In one embodiment, a third opening edge of the first opening is provided with a third connection plate thereon, such that the first opening is correspondingly assembled with a tube opening of the waveguide tube by connecting the third connection plate with a connection plate that is provided at an opening edge of the tube opening.

BRIEF DESCRIPTION OF THE DRAWINGS

The invention, as well as a preferred mode of use and advantages thereof, will be best understood by referring to the following detailed description of an illustrative embodiment in conjunction with the accompanying drawings, wherein.

DETAILED DESCRIPTION OF THE PREFERRED EMBODIMENTS

To more clearly describe a material processing apparatus using quasi-traveling microwave to conduct heat treatment disclosed by the present invention, embodiments of the present invention will be described in detail with reference to the attached drawings hereinafter.

Figure 1:
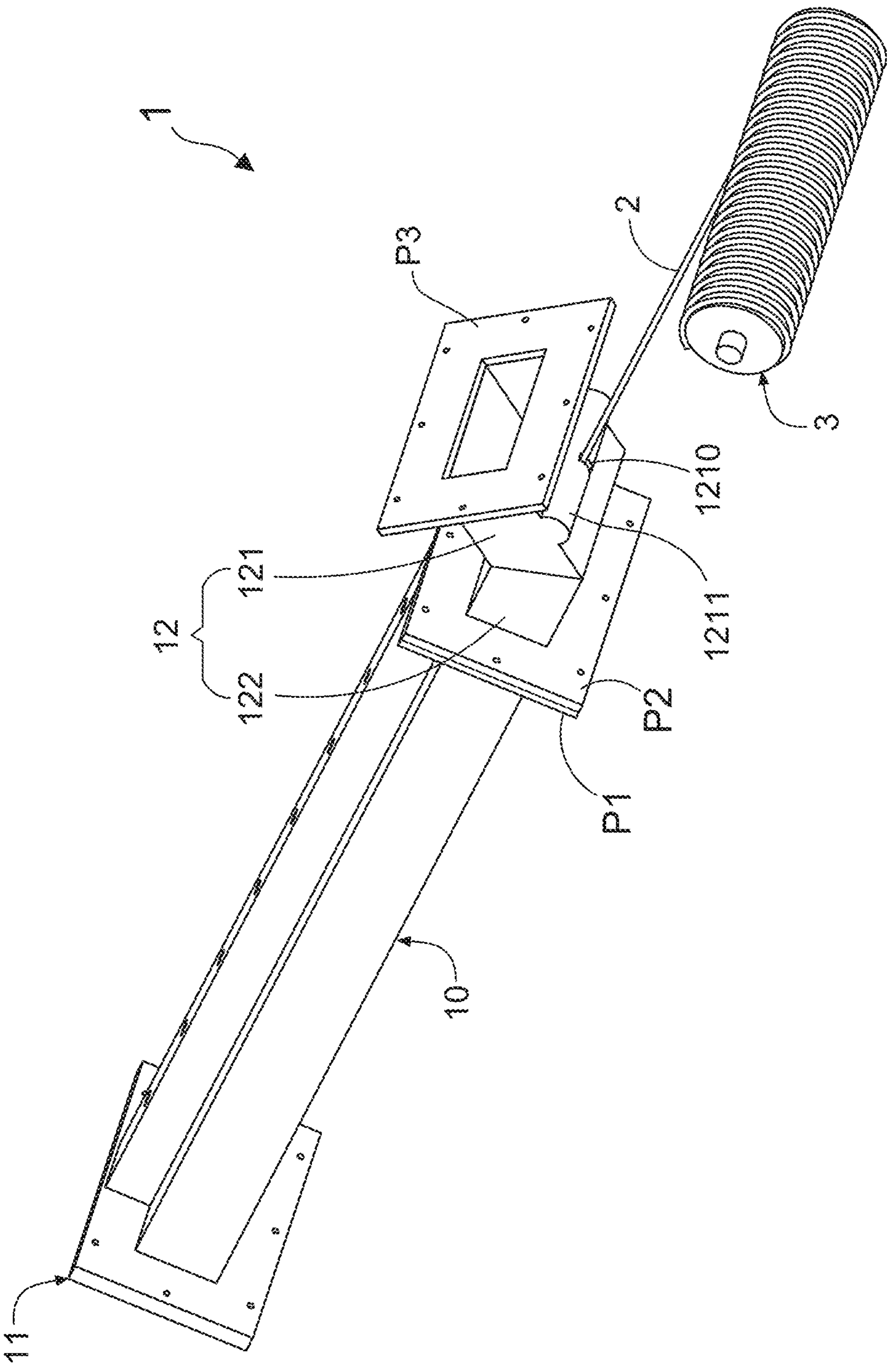
FIG. 1 shows a first stereo diagram of a material processing apparatus using quasi-traveling microwave to conduct heat treatment according to the present invention.
Figure 2:
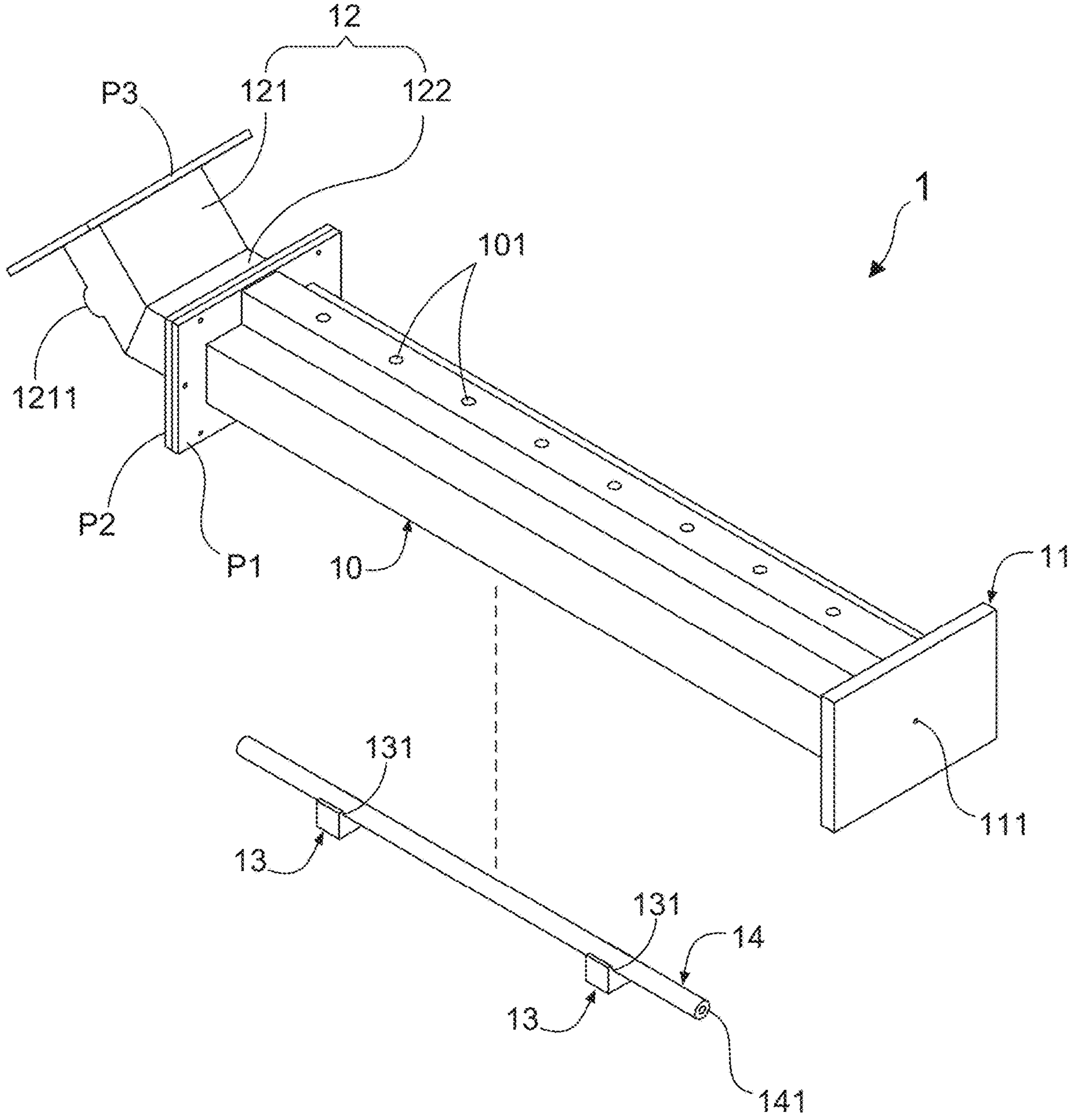
FIG. 2 shows an exploded view of the material processing apparatus according to the present invention.
Figure 3:
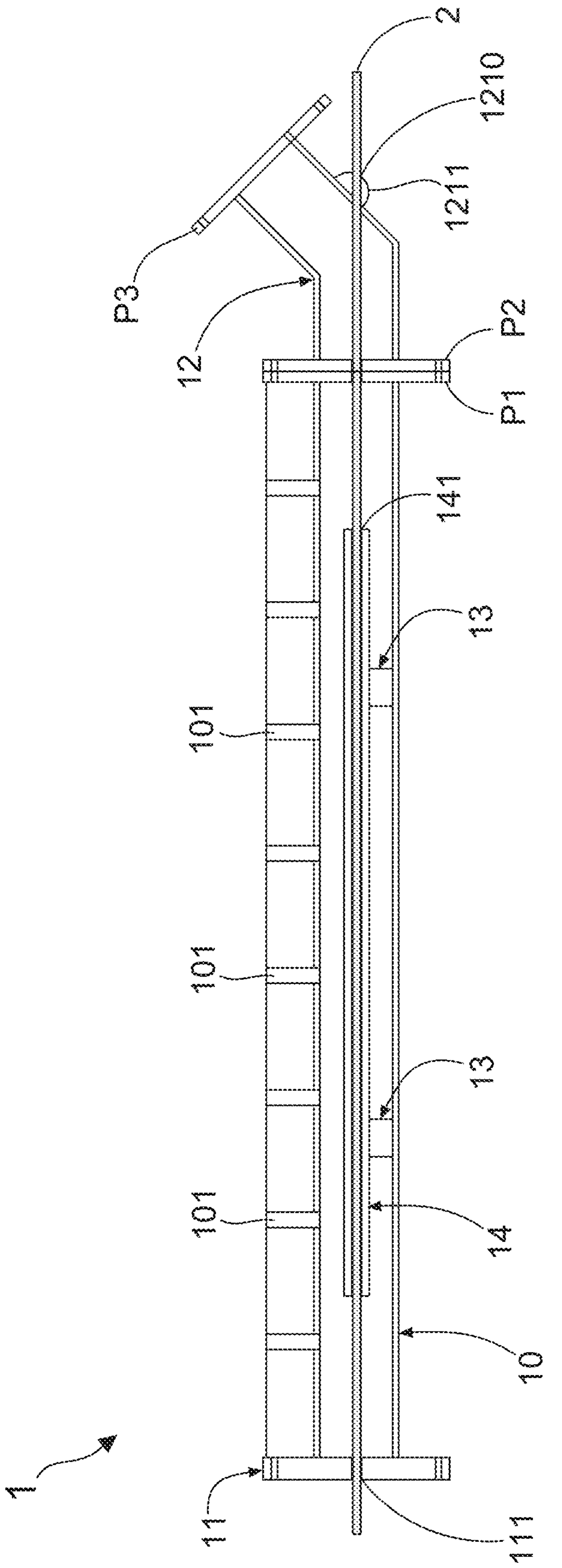
FIG. 3 shows a cross-sectional side view of the material processing apparatus according to the present invention.

With reference to FIG. 1, there is shown a first stereo diagram of a material processing apparatus using quasi-traveling microwave to conduct heat treatment according to the present invention. Moreover, FIG. 2 illustrates an exploded view of the material processing apparatus and FIG. 3 shows a cross-sectional side view of the material processing apparatus. The present invention discloses a material processing apparatus 1 using quasi-traveling microwave to conduct heat treatment according to the present invention ("material processing apparatus 1", hereinafter), which comprises: a primary waveguide tube 10, a microwave blocking plate 11, a secondary waveguide tube 12, at least one thermal insulation block 13, and at least one microwave absorbing member 14.

Figure 4:
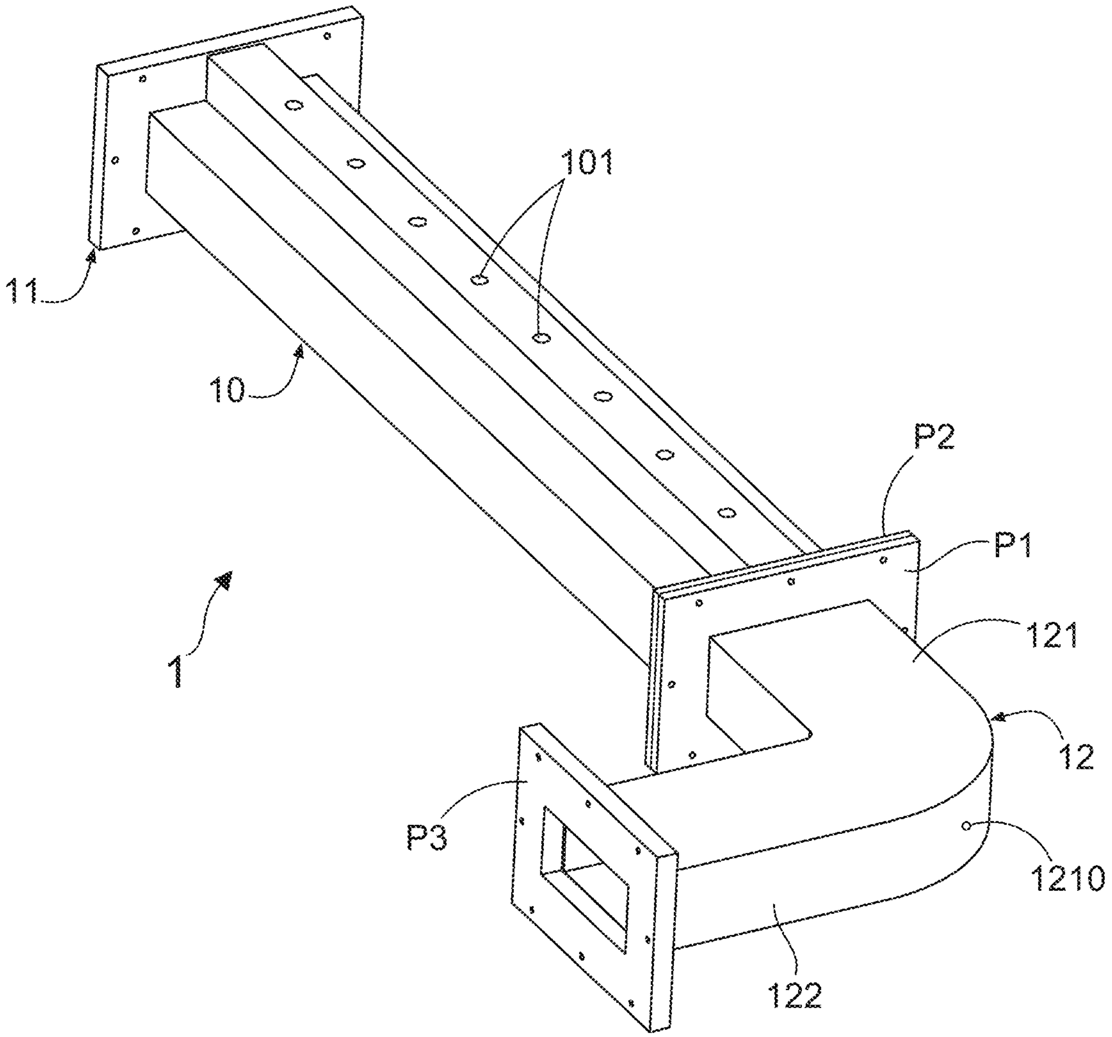
FIG. 4 shows a second stereo diagram of the material processing apparatus according to the present invention.

Like FIG. 2, FIG. 3 and FIG. 4 shows, the primary waveguide tube 10 has a front opening and a rear opening, and the microwave blocking plate 11 is connected to the primary waveguide tube 10 for shielding the rear opening. It is worth noting that, the microwave blocking plate 11 is provided with at least one material exporting hole 111 thereon. As described in more detail below, the secondary waveguide tube 12 consists of a first segment 121 and a second segment 122, wherein the first segment 121 has a first opening correspondingly connected to a waveguide tube of a microwave source, and the second segment 122 has a second opening for being correspondingly assembled with the front opening of the primary waveguide tube 10. Moreover, the first segment 121 is provided with at least one material importing hole 1210 thereon that is coaxial to the at least one material exporting hole 111, and there is a bending angle existing between the second segment 122 and the first segment 121.

In one practicable embodiment, the primary waveguide tube 10 and the secondary waveguide tube 12 are both made of a metal material, and can both be a rectangular waveguide tube, a circular waveguide tube, or an irregular waveguide tube. On the other hand, the thermal insulation block 13 is disposed of in the primary waveguide tube 10, and the disposing number of the thermal insulation block 13 is at least 1. The thermal insulation blocks 13 are made of a material having low thermal conductivity, such as asbestos, cork, sawdust, or magnesium oxide. According to FIG. 2 and FIG. 3, it is understood that thermal insulation block 13 has a recessed groove 131 for correspondingly receiving a bottom of the microwave absorbing member 14, such that the microwave absorbing member 14 is thermally isolated with inner walls of the primary waveguide tube 10.

In one practicable embodiment, the microwave absorbing member 14 is made of a microwave absorbing material, and the disposing number of the microwave absorbing member 14 is also at least 1. According to the definitions, microwave absorbing material is a functional material that is capable of converting the electromagnetic wave radiated onto the surface thereof into heat energy through dielectric loss and/or magnetic loss. For example, all SiC, $Si_3N_4$, and SiC/$Si_3N_4$ compounds are microwave absorbing materials with high-temperature resistance. Therefore, the present invention not particularly limits the manufacturing material of the microwave absorbing member 14. As FIG. 2 and FIG. 3 show, the microwave absorbing member 14 is designed to have at least one hollow cavity 141. By such arrangements, at least one thread-type article 2 can be fed into the secondary waveguide tube 12 via at least one material importing hole 1210 by using a driver device 3. Subsequently, the driver device 3 drives (e.g., unwinding mechanism) the thread-type article 2 to move into at least one hollow cavity 141, and to eventually leave the primary waveguide tube 10 via at least one material exporting hole 111 of the microwave blocking plate 11.

According to the particular design of the present invention, the microwave source supplies a microwave into the second waveguide tube 12 and the primary waveguide tube 10, such that the microwave travels in the second waveguide tube 12 and the primary waveguide tube 10 along a wavefront so as to become a quasi-traveling microwave. As a result, in case of moving in the second waveguide tube 12 and/or the primary waveguide tube 10, a first part of the thread-type article 2 and the microwave absorbing member 14 are both heated because of directly receiving the quasi-traveling microwave, and a second part of the thread-type article 2 is heated by the inner walls of the hollow cavity 141 because of locating in the hollow cavity 141.

Therefore, according to the above descriptions, it is understood that, in spite of the fact that the thread-type article 2 does not have an adequate dielectric loss and/or magnetic loss to convert the electromagnetic wave into heat energy, it would still be moved into the hollow cavity 141 so as to be steadily and evenly heated by the inner walls of the hollow cavity 141.

Briefly speaking, the present invention proposes a material processing apparatus using quasi-traveling microwave to conduct heat treatment. As FIG. 3 shows, after suppling a microwave into the primary waveguide tube 10 and the secondary waveguide tube 12, the microwave travels in the two waveguide tubes so as to become a quasi-traveling microwave. Therefore, in the case of a thread-type article 2 being be fed into the primary waveguide 10 tube via the secondary waveguide tube 12 by a thread-type article transferring mechanism (e.g., unwinding mechanism), the thread-type article 2 is steadily and evenly heated by the quasi-traveling microwave in the two waveguide tubes. In addition, the present invention further arranges a microwave absorbing member 14 in the primary waveguide 10. By such arrangement, when being moved in the primary waveguide tube 10, the thread-type article 2 is not merely heated by receiving the quasi-traveling microwave and is also heated by the microwave absorbing member 14 in case of being moved in the hollow cavity 141 of the microwave absorbing member 14. Therefore, the material processing apparatus using quasi-traveling microwave to conduct heat treatment proposed by the present invention has a significant potential to replace the conventional microwave heat treatment apparatus or microwave drying equipment, so as to be used for steadily and evenly heating the thread-type article 2 like fiber, silk, artificial fiber, and artificial silk.

It is worth further explaining that, for enhancing the drying efficiency, the microwave drying unit is designed to include multiple microwave sources to simultaneously supply multiple microwaves into the resonant cavity, so as to form a multi-mode standing wave in the resonant cavity. However, according to real experiences, in case of each microwave's parameters (e.g., wavelength and frequency) are not to be optimized, it is difficult to utilize the multi-mode standing wave to both evenly heat the silk and/or the fiber and achieve a high drying efficiency. On the contrary, according to the particular design of the present invention, the microwave generated by the microwave source is transformed into a quasi-traveling microwave but not a standing wave. Therefore, the mode (i.e., TE or TM) of the microwave is easily controlled. Moreover, because the microwave travels in the second waveguide tube 12 and the primary waveguide tube 10 along a wavefront so as to become a quasi-traveling microwave, there is no standing wave formed in the primary waveguide tube 10 and/or the secondary waveguide tube 12, such that no phase interference occurring in the two waveguide tubes.

As FIG. 2 and FIG. 3 show, a plurality of observation windows 101 are provided on a top side of the primary waveguide tube 10, wherein each of the observation windows 101 is made of quartz glass. Moreover, a first opening edge of the front opening is provided with a first connection plate P1 thereon, and a second opening edge of the second opening being provided with a second connection plate P2 thereon, such that the front opening is correspondingly assembled with the second opening by connecting the first connection plate P1 with the second connection plate P2. On the other hand, a third opening edge of the first opening is provided with a third connection plate P3 thereon, such that the first opening is correspondingly assembled with a tube opening of the waveguide tube by connecting the third connection plate P3 with a connection plate that is provided at an opening edge of the tube opening.

Furthermore, FIG. 1, FIG. 2, and FIG. 3 all depict that, the thread-type article 2 is fed into the second waveguide tube 12 via the material importing hole 1210 of the first segment 121, and the microwave source supplies the microwave into the second waveguide tube 12 through the first opening of the first segment 121. Therefore, for facilitating that the material processing apparatus 1 can be applied in an automatic production line by being integrated with a microwave source and a driver device 3 (e.g., unwinding mechanism), the second segment 122 and the first segment 121 are particularly designed to have a bending angle therebetween, and the at least one material importing hole 1210 is provided on a bottom side of the first segment 121. By such design, it is easy to find that the material importing hole 1210 is not coaxial to the first opening of the first segment 121.

Figure 5:
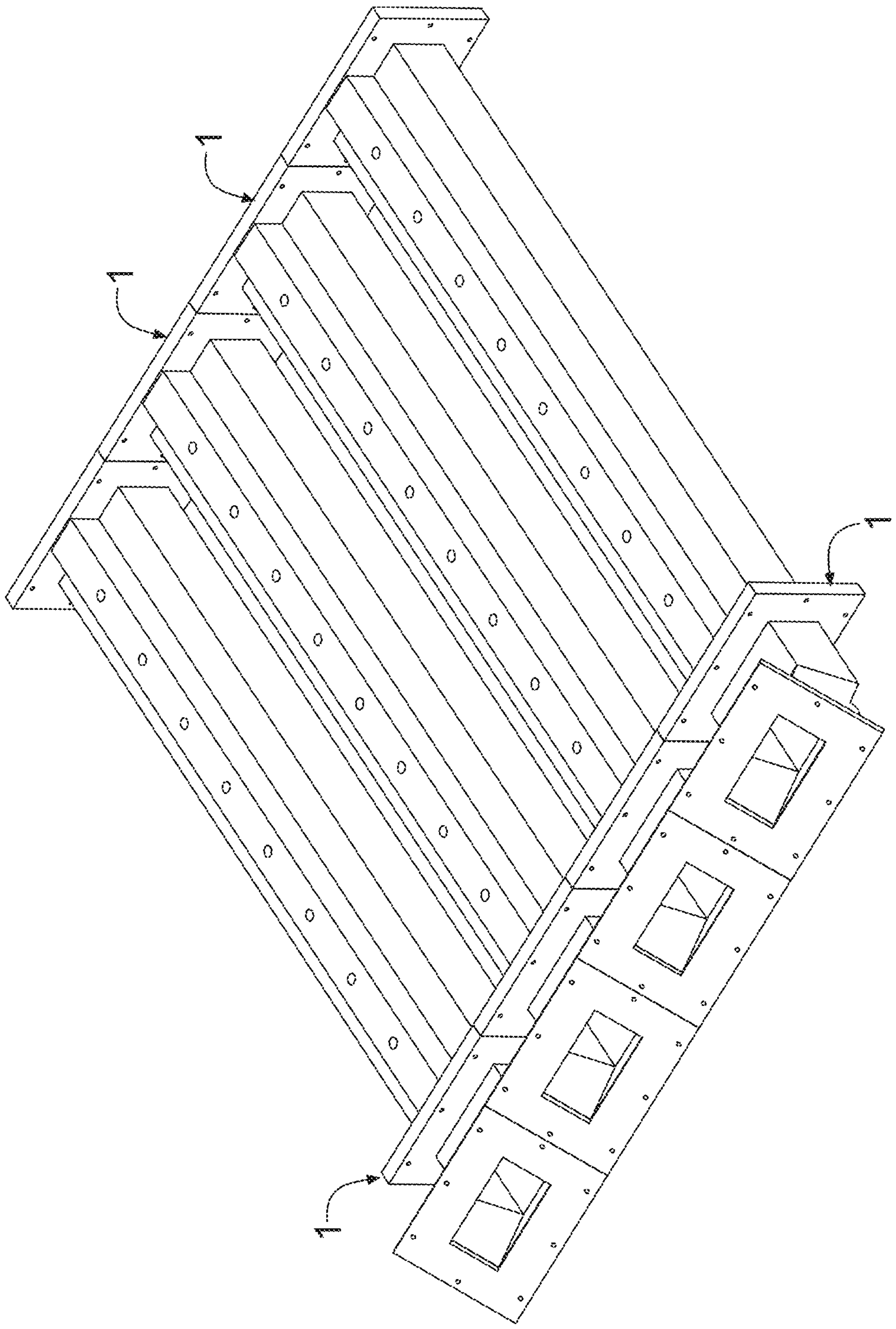
FIG. 5 shows a diagram for describing an application of the material processing apparatus according to the present invention.

FIG. 4 shows a second stereo diagram of the material processing apparatus according to the present invention. According to FIG. 2 and FIG. 3, the top side and the bottom side of the first segment 121 of the secondary waveguide tube 12 are both parallel to a horizontal plane, but the top side and the bottom side of the second segment 122 of the secondary waveguide tube 12 are both intersected with the horizontal plane. As described in more detail below, the top side of the second segment 122 and the horizontal plane have an included angle therebetween, and the bottom side of the second segment 122 and the horizontal plane have the same included angle therebetween. In another practicable embodiment, as FIG. 5 shows, the secondary waveguide tube 12 is also designed to be a bent waveguide tube. However, the top side and the bottom side of the first segment 121 of the secondary waveguide tube 12 are both parallel to a horizontal plane, and the top side and the bottom side of the second segment 122 of the secondary waveguide tube 12 are also both intersected with the horizontal plane. In other words, the present invention merely limits that the second segment 122 and the first segment 121 have bending angles therebetween, but not particularly limits the bending direction or plane of the bent waveguide tube (i.e., secondary waveguide tube 12).

Moreover, the first segment 121 is provided with a cushion block 1211 thereon, and the material importing hole 1210 perforates both the first segment 121 and the cushion block 1211. On the other hand, FIG. 5 shows a diagram for describing an application of the material processing apparatus according to the present invention. According to FIG. 5, it is allowed to stack or connect multiple material processing apparatuses 1 to be a high throughput material heating equipment, so as to utilize this material heating equipment to conduct a heating process of multiple thread-type articles 2 (e.g., fiber, silk, artificial fiber, and artificial silk) steadily and evenly.

Therefore, through the above descriptions, all embodiments of the material processing apparatus using quasi-traveling microwave to conduct heat treatment according to the present invention have been introduced completely and clearly. Moreover, the above description is made on embodiments of the present invention. However, the embodiments are not intended to limit the scope of the present invention, and all equivalent implementations or alterations within the spirit of the present invention still fall within the scope of the present invention.

What is claimed is:

1. A material processing apparatus, comprising:

a primary waveguide tube, having a front opening and a rear opening;

a microwave blocking plate, being connected to the primary waveguide tube for shielding the rear opening, and having at least one material exporting hole;

a secondary waveguide tube consisting of a first segment and a second segment, wherein the first segment has a first opening correspondingly connected to a waveguide tube of a microwave source, the second segment having a second opening for being correspondingly assembled with the front opening of the primary waveguide tube, a bending angle existing between the second segment and the first segment, and the first segment is provided with at least one material importing hole thereon that is coaxial to the at least one material exporting hole; and at least one microwave absorbing member made of a microwave absorbing material, being disposed of in the primary waveguide tube, and having at least one hollow cavity;

wherein by using a driver device, at least one thread-type article being fed into the secondary waveguide tube via the at least one material importing hole, subsequently moving into at least one hollow cavity, and eventually leaving the primary waveguide tube via the at least one material exporting hole of the microwave blocking plate;

wherein the microwave source supplies a microwave into the second waveguide tube and the primary waveguide tube, such that the microwave travels in the second waveguide tube and the primary waveguide tube along a wavefront so as to become a quasi-traveling microwave;

wherein in case of moving in the second waveguide tube and/or the primary waveguide tube, a first part of the thread-type article and the microwave absorbing member being both heated because of receiving the quasi-traveling microwave, and a second part of the thread-type article being heated by inner walls of the hollow cavity.

2. The material processing apparatus of claim 1, wherein the primary waveguide tube and the secondary waveguide tube are both selected from a group consisting of rectangular waveguide tube, circular waveguide tube, and irregular waveguide tube.

3. The material processing apparatus of claim 1, wherein the primary waveguide tube and the secondary waveguide tube are both made of a metal material.

4. The material processing apparatus of claim 1, wherein there is at least one thermal insulation block disposed of in the primary waveguide tube for supporting the at least one microwave absorbing member, such that the microwave absorbing member is thermally isolated with inner walls of the primary waveguide tube.

5. The material processing apparatus of claim 4, wherein the thermal insulation block has a recessed groove for correspondingly receiving a bottom of the microwave absorbing member.

6. The material processing apparatus of claim 1, wherein the thread-type article is selected from a group consisting of fiber, silk, artificial fiber, and artificial silk.

7. The material processing apparatus of claim 1, wherein there is a plurality of observation windows provided on a top side of the primary waveguide tube, and each of the observation windows is made of quartz glass.

8. The material processing apparatus of claim 1, wherein the first segment is provided with a cushion block thereon, and the at least one material importing hole perforating both the first segment and the cushion block.

9. The material processing apparatus of claim 1, wherein a first opening edge of the front opening is provided with a first connection plate thereon, and a second opening edge of the second opening being provided with a second connection plate thereon, such that the front opening is correspondingly assembled with the second opening by connecting the first connection plate with the second connection plate.

10. The material processing apparatus of claim 9, wherein a third opening edge of the first opening is provided with a third connection plate thereon, such that the first opening is correspondingly assembled with a tube opening of the waveguide tube by connecting the third connection plate with a connection plate that is provided at an opening edge of the tube opening.

* * * * *